Figure 1:

United States Patent

Yano et al.

[15] 3,681,374

[45] Aug. 1, 1972

[54] SYNTHETIC NACREOUS TRIAZOLE CRYSTALS AND METHOD FOR PRODUCTION THEREOF

[72] Inventors: Nobumitsu Yano, Iruma; Masao Fukushima, Tokyo; Itaru Fukinbara, Tokyo; Masanori Kishi, Tokyo, all of Japan

[73] Assignee: Assahi Kasei Kogyo Kabushiki Kaisha, Osaka, Japan

[22] Filed: Aug. 11, 1970

[21] Appl. No.: 62,800

[52] U.S. Cl..........260/308 R, 106/291, 106/DIG. 2, 117/159, 260/17 R, 260/30.2, 260/37 P, 260/40 R, 260/41 C, 260/308 C, 424/269
[51] Int. Cl. ......................C07d 55/06, C09d 5/36
[58] Field of Search.......260/308 R; 106/291, DIG. 2

[56] References Cited

FOREIGN PATENTS OR APPLICATIONS 222,881   10/1925   Great Britain................106/291

OTHER PUBLICATIONS

Yano et al., Chem. Abstracts, Vol. 73, Abstract No. 67761Z (1970). QD1A51

*Primary Examiner*—Alton D. Rollins
*Attorney*—Cushman, Darby & Cushman

[57] ABSTRACT

Pearl luster is developed by synthetic, nacreous, flake-shaped crystals of triazole compounds having a maximum length of 5 to 100 microns and a thickness of 500 to 1,200 A which are obtained by cooling a solution of a triazole compound in the presence of a surface active agent. The synthetic nacreous crystals are added to aqueous or alcoholic cosmetic lotions, soaps, milky lotions or pigment dispersions, whereby articles having elegant pearl luster can be obtained.

13 Claims, 2 Drawing Figures

INVENTORS
NOBUMITSU YANO
MASAO FUKUSHIMA
ITARU FUKINAARA
MASANORI KISHI

BY Cushman, Darby & Cushman
ATTORNEYS

SYNTHETIC NACREOUS TRIAZOLE CRYSTALS AND METHOD FOR PRODUCTION THEREOF

The present invention relates to non-toxic, nacreous, flake-shaped crystals of triazole compounds, and to a method for the production thereof. Further, the present invention relates to nacreous pigments comprising essentially said flake-shaped crystals of triazole compounds.

Nacreous pigments have been studied from old times for the production of imitation pearls and nacreous articles. Among these, fish platelets obtained from fishes are particularly notable. In addition thereto, basic lead carbonate, lead carbonate, lead arsenate, etc. have also been known as synthetic nacreous pigments. The fish platelets have been used from the most old time, but they are not only quite expensive but also contain inherently a large amount of impurities. In case the fish platelets are used as nacreous pigments to produce nacreous products, the said impurities adversely affect the products during storage, finally causing the yellowing or reddening of the product. Further, the fish platelets liberate an offensive odor if the purification thereof has not been sufficient. Because of such drawbacks as mentioned above, the fish platelets have not been suitable for use as materials for the modern industry where the mass production of standardized products is always required.

Various synthetic materials capable of developing pearl luster have been studied in order to obtain excellent nacreous pigments free from the above-mentioned drawbacks of the fish platelets. However, the aforesaid basic lead carbonate, lead arsenate, etc. are toxic and low in resistance to chemicals, so that they have also been unsuitable for use in cosmetics, foodstuffs and beverages and for decoration of synthetic resins for toys, containers for foods and the like.

In view of the above, the present inventors have made extensive studies on organic non toxic compounds capable of generating pearl luster which can be produced at low costs. As the result, the inventors have found that when produced according to the specific method, crystals of triazole compounds can satisfy the conditions for generating pearl luster.

An object of the present invention is to provide flake-shaped triazole crystals having a maximum length of 5 to 100 microns and a thickness of 500 to 1,200 A.

Another object of the present invention is to provide a method of producing said flake-shape triazole crystals which comprises cooling a solution of triazole compound in the presence of a surface active agent.

A further object of the present invention is to provide synthetic, nacreous non-toxic pigments comprising essencially said flake-shaped triazole crystals, which generate excellent pearl luster when incorporated into cosmetics, plastics, coating materials, beverages, corn cups and synthetic resins.

Other objects and advantages of the invention will become apparent from the following description.

Generally, materials to be used for the development of pearl luster are required to satisfy such conditions that the crystals of the materials should be high in refractive index; in the form of thin plates of flakes having a maximum length of 5 to 100 microns and a thickness of 500 to 1,200 A; colorless and transparent, and smooth in surface; chemically and optically stable; resistant to heat, insoluble in organic solvents; and well dispersible in paints and the like.

The triazole compounds used in the present invention are represented by the general formula,

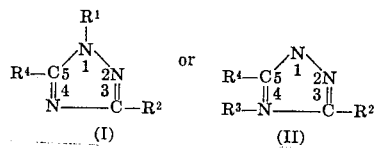

wherein $R^1$ represents a —H, —$CH_3$, —$C_6H_5$ or —$NH_2$ group; $R^2$ represents a —H, —OH, —COOH, —$CH_3$, —$C_6H_5$, —SH or —$NH_2$ group; $R^3$ represents a —H, —$C_6H_5$ or —$NH_2$ group; and $R^4$ represents a —H, —$CH_3$, —$C_6H_5$, —$NH_2$, —SH, —COOH or —OH group.

When crystallized according to an ordinary procedure, the above-mentioned triazole compounds are brought into the form of powders or column-shaped crystals, and thus fail to satisfy the condition that the crystals should be in the form of thin plates or flakes. As the result of various studies, however, the present inventors have found that when, in the crystallization of triazole compound, a surface active agent is added to a solution of the triazole compound, uniform and flake-shaped crystals of the triazole compound, which develop pearl luster and which are smooth in surface, can be easily produced in high yields.

The reason why the above-mentioned effect can be attained by addition of the surface active agent in accordance with the present invention has not been clarified yet. However, it is considered that by addition of the surface active agent, the solution of the triazole compound is varied in physical properties, density balance, diffused state, etc., with the result that the solution is maintained in a favorable state for the formation of crystal nuclei and for the growth of flake-shaped fine crystals.

The above-mentioned method for producing a synthetic uniform nacreous crystals smooth in surface which are obtained by using a surface active agent in the step of crystallization of the triazole compound capable of generating pearl luster is entirely novel.

Examples of the triazole compound used in the present invention are urazole (i.e., 3,5-diamino-1,2,4-triazole), guanazole (i.e., 3,5-diamino-1,2,4-triazole), guanazine (i.e., 3,4,5-triamino-1,2,4-triazole), 5-phenyl-3-hydroxy-1,2,4-triazole, 5-amino-3-carboxy-1,2,4-triazole, 3-mercapto-1,2,4-triazole, 1-phenyl-3-hydroxy-1,2,4-triazole, 3,5-diphenyl-1,2,4-triazole, 1-amino-1,2,4-triazole, 3-amino-1,3,4-triazole, 5-amino-3-methyl-1,2,4-triazole, 4-amino-3,5-dimethyl-1,2,4-triazole, 4-methyl-3-mercapto-1,2,4-triazole, 3-mercapto-1-phenyl-1,2,4-triazole, 5-mercapto-1-phenyl-1,2,4-triazole, 4-amino-3-mercapto-1,2,4-triazole, 3-mercapto-1,5-diphenyl-1,2,4-triazole, 1-phenyl-1,2,4-triazole-3-carboxylic acid, 5-amino-1,2,4-triazole-3-carboxylic acid, 5-methyl-3-hydroxy-1,2,4-triazole (or 5-methyl-1,2,4-trazole-3-one), 3-methyl-5-hydroxy-1,2,4-triazole (or 3-methyl-1,2,4-triazole-5-one), 1-phenyl-3-hydroxy-1,2,4-triazole (or 1-phenyl-1,2,4-triazole-3-one), 5-phenyl-3-hydroxy-1,2,4-triazole (or 5-phenyl-1,2,4-triazole-3-one), 1-phenyl-5-hydroxy-1,2,4-triazole (or 1-phenyl-1,2,4-triazole-5-one), 1- phenyl-urazole, 4-phenyl-urazole, 4-amino-urazole and 4-amino-1-phenylourazole.

The surface active agent used in the present invention includes cationic surface active agents such as amines, salts thereof, quaternary ammonium salts, pyridinium salts, picolinium salts, zelanium salts, belanium salts, amine-formamide condensation products and stearon chromic chloride; anionic surface active agents such as alkyl sulfates, alkyl-benzene sulfonates, alkylnaphthalene sulfonates, naphthalene sulfonate-formaldehyde condensation products, alkyl phosphates, amidosulfonates and sulfo-succinate dialkyl esters; amphoionic surface active agents of such types as betain type (e.g. alkyl betaines), sulfoxylate type (e.g. hydroxyethyl-imidazoline sulfonate), sulfonate type and phosphate type; and nonionic surface active agents of such types as esters type e.g. polyoxyethylene laurate, polyoxyethylenestearate and polyoxyethylenoleate; ether type, e.g. polyoxyethylene cetylether and polyoxyethylene stearylether; alkylphenol type, e.g. polyoxyethylene alkylphenolether; Span type, e.g. sorbitan alkylester and tween type, e.g. sorbitanmonoalkyl ester.

The amount of the surface active agents to be used in the crystallization of the triazole compound varies depending on the kinds of said surface active agent and triazole compound, but is preferably 1 to 0.001 percent by weight based on the weight of the solution of triazole compound, in general. The surface active agent may be added from the beginning to the abovementioned solution or may be added either immediately before or after the deposition of initial fine crystals.

The flake-shaped crystals first begin to precipitate at 50° C. and therefore, the precipitation can be conducted at any temperature not higher than 50° C., so long as the system remains in the form of a liquid. However, in consideration of the ease with which the precipitated crystals can be removed and other operational parameters, temperatures as low as lower than 0° C. are economically not attractive. Practically, the temperatures for precipitation ranges from 50° to 5° C.

Due to the layered configuration of the crystals, the triazole crystals successfully interfere and reflect the lights to develop pearl luster. Therefore, the flake-shaped triazole crystals of the present invention can be advantageously used as nacreous pigments which, when incorporated into articles, impart beautiful pearl luster or streamline pattern to the articles. Such pigments can be incorporated into matters in any manner in which conventional pigments are used. The crystals may sometimes be added as they are to aqueous or alcoholic face lotions or incorporated into soaps or milky lotions. Generally, however, they are dispersed in a dispersion of an ordinary pigment and, if necessary, the dispersion is mixed with other additive, e.g. nitrocellulose or the like, whereby a pigment having elegant pearl luster is obtained.

The triazole compounds, which are used as main starting material in the present invention, are prepared by reacting cyanic compounds with hydrazine. All of the thus prepared triazole compounds are colorless and in the form of crystals somewhat like powders. Even when such powdery matters are dispersed as they are in water or ethanol, the resulting dispersions have no pearl luster and, even when subjected to stirring, the dispersions show no streamline pattern. However, when formed under suitable conditions into crystals which have a maximum length of 5 to 100 microns and a thickness of 500 to 1,200 A and which are smooth in surface, the compounds develop elegant pearl luster.

The triazole crystals of the present invention as such have good thermal stability, chemical resistance and weather resistance. Generally, the crystals of the present invention are added as such or they are preliminarily dispersed in water, ethanol, acetone or hexane and the resulting dispersions are added, with other necessary additives, to base components. The amount of the crystals to be added to base components varies depending on the kind, uses and quality of the desired product, and the larger the amount, the brighter and more vivid the pearl luster is. In consideration of economy and comodity value such as taste or the like, however, the amount of the crystal is preferably 0.1 to 5 percent by weight. The triazole compound of the present invention may be used in combination with conventional materials having pearl luster, e.g., fish platelets, basic lead carbonate, etc., or 2 or more of the triazole compounds may be used in admixture. In some cases, such combination use as mentioned above gives effects to increase the characteristics of the compounds as pigments.

The nacreous pigment comprising flake-shaped crystals of the present invention can be incorporated into various matters, of which the following are successful on a commercial scale.

1. Foods: For corn cups and eatable films, the crystals are added to the materials as such. The mixtures are processed in a usual manner to give products having nacreous streamline pattern on the surface.

2. Beverages: The crystals are added to alcoholic beverages and soft drinks.

3. Drugs: The crystals are added as such or in dispersion to the material of the coatings for tablets.

4. Cosmetics: In the case of lip stick or nail enamel the crystals are required to be dispersed in the cosmetic as uniformly as possible, so that the compound is added at the time when the cosmetic is kneaded with other materials, i.e. before the cosmetic becomes a solid, so as to disperse the compound uniformly into the product. In the case of alcoholic face lotion and powder, the crystals are, as they are, added to them. Further, they are added to soaps or milky lotion before processing.

5. Coating compositions: To prepare lacquer compositions, the crystals are preliminarily dispersed at a higher concentration in a vinyl acetatenitrocellulose solution and the resulting dispersion is added to the lacquor. In the case of Japanese lacquer compositions, the crystals are first dissolved in turpentine oil and the resulting mixture is added to Japanese lacquer. To prepare polyvinyl resin printing compositions, the crystals are added to a polyvinyl resin solution such as polyvinyl chloride solution in methylisobutyl ketone. To prepare coating compositions for leather, the crystals are mixed with methylisobutyl ketone and the resulting mixture is applied on leather. In addition thereto, the crystals may be mixed with paints, lacquers or enamels to increase the decorating functions of said coating materials. It is also possible to enhance the decorativeness of paper, fibers, leathers, metal plates or the like by mixing the triazole compound with dyes or pigments. In case decorativeness is desired to be imparted to paper, leather or glass plate, screen, it is sometimes sufficient that the triazole compound is dissolved in a solvent together with a suitable sizing agent and the resulting solution is sprayed onto the surface of the material to be treated, followed by drying.

6. Decorative plates: In the case of such a synthetic resin article as tableware or decorative plate, it is sometimes possible that the nacreous pigment of the present invention is previously incorporated into other molding materials so as to be uniformly dispersed in the product.

As synthetic resins to which pearl luster may be imparted, any resins whose refraction rate is more than 0.2 lower than that of triazole crystals are suitable, for example, polyvinyl chloride, polyvinyl acetate, polyvinyl chloride-polyvinyl acetate copolymers, polymethyl methacrylate, polyesters, polyethylene, polypropylene, polystyrene, phenolformaldehyde resins and amine-formaldehyde resins.

The manner of addition may be varied depending upon the kinds of resins. For example, the crystals may be added to a prepolymer solution and the whole mixture is heated to complete polymerization.

Alternatively, the crystals may be dispersed in a suitable organic solvent and the resulting dispersion is added to polymer chips together with other additives. The whole mixture is processed in a usual manner into a decorative sheet or plate.

The present nacreous pigments have such advantages as enumerated below.

1. They can be produced from inexpensive starting materials.
2. They are chemically stable and high in resistance to weathering.
3. They are lower in specific gravity than inorganic pigments such as basic lead carbonate, lead arsenate, etc., so that pearl luster can be developed even when they are used in small amounts. At the same time, they can be uniformly dispersed with ease into common pigment compositions.
4. In comparison with fish platelets, they can always give products having the same quality with ease, so that the mass production of desired products is possible.

A comparison in properties between the present pigment and typical conventional pigments is as follows:

|  | Typical conventional pigments | | Present pigment |
| --- | --- | --- | --- |
|  | Basic lead carbonate | Fish platelets | Guanadine |
| Specific gravity | 6.14 | 1.70 | 1.58 |
| Toxicity | Great | None | None |
| Melting point (°C) | 220 | 250 (colored) | 257 (decomposed) |
| Hydrogen sulfide* resistance | Low | Favorable | Excellent |
| Light resistance** | Low | Low | Excellent |

Note: * The test was effected according to the process described in Example 6.
** The test was effected by allowing a nacreous sheet treated in the same manner as in Example 6 to stand outdoors for 1 month in summer. The nacreous sheet containing basic lead carbonate was substantially deprived of pearl luster, and was nacreous sheet containing fish platelets were yellowed, whereas no change was observed in the nacreous sheet containing guanadine of the present invention.

Figure 2:
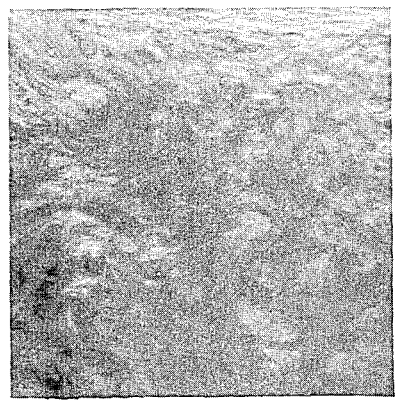

In the accompanying drawings, FIG. 1 is a photograph of a decorative plate obtained by incorpolating guanazole prepared in Example 1 into a polymethyl methacrylate resin; and FIG. 2 is a photograph of a decorative plate obtained by incorporating urazole prepared in Example 3 into a polymethyl methacrylate resin.

The present invention is illustrated in further detail below with reference to examples.

EXAMPLE 1

1 kg. of colorless powdery crystals of guanazole, i.e., 3,5-diamino-1,2,4 -triazole, were dissolved at an elevated temperature in 100 l. of distilled water. Subsequently, the temperature of the resulting solution was lowered to 50° C. and, at this stage, there was added to the solution 50 g. of the anionic surface active agent "-MARBON" (a condensate of oleic acid with methyl urethane; trade name of Matsumoto Yushi Kagaku Kogyo K.K.). The temperature of the resulting mixture was lowered with stirring to 20° C. over a period of about 1 hour, at said temperature, the stirring was continued for 2 hours to precipitate pentagonal flake-shaped crystals having pearl luster with a size of 15 to 20 microns in maximum length and 700 A in thickness. The precipitated crystals were centrifugally separated to obtain an aqueous slurry having a crystal concentration of 60 percent by weight. To 100 parts by weight of this slurry was added 15 parts by weight of a low viscosity saturated polyester resin containing 5 percent by weight of the nonionic surface active agent, sorbitan monooleate, and the resulting mixture was stirred. Thereafter, liberated water was removed by decantation to obtain a paste containing 15 percent by weight of water. This paste was washed with ethanol to prepare a nacreous pigment. The thus prepared pigment was homogeneously mixed with a methyl methacrylate prepolymer in an amount of 0.5 percent by weight based on the weight of the polymer. Subsequently, the resulting mixture was placed between 2 glass plates faced each other at an interval of 7 mm. The thus formed composite was immersed for 30 minutes in boiling water to complete the polymerization of the prepolymer. After cooling the composite, the glass plates were removed to obtain a polymethyl methacrylate resin plate having a streamline pattern. FIG. 1 is a photograph of the thus obtained decorative plate.

EXAMPLE 2

2 parts by weight of the guanazole crystals which have been prepared and washed with ethanol as in Example 1 were dispersed in 5 parts by weight of o-dichlorobenzene. To this dispersion was added 1 part by weight of a 100 percent oil-soluble phenolic resin to prepare a pigment. The thus prepared pigment was applied onto the surface of the globular urea resin and vaporized over a period of about 20 hours in a semi-closed vessel to obtain globules having brilliant pearl luster.

EXAMPLE 3

2 kg. of needle-like crystals of urazole, i.e., 3,5-dihydroxy-1,2,4-triazole, were dissolved in 100 l. of hot water. To the resulting solution was added 1.5 l. of a 1 wt percent solution of the nonionic surface active agent "ACTINOL" (stearic acid monoglyceride; trade name of Matsumoto Yushi Kagaku Kogyo K.K.). The mixed solution was allowed to stand in a cold chamber kept at 5° C. to form, after about 10 hours, flake-shaped crystals having a maximum length of 10 microns, a width of 3 microns and a thickness of 700 A. The thus formed crystals were centrifugally separated to obtain a slurry having a crystal concentration of 60 percent by weight. To 100 parts by weight of this slurry was added 15 parts by weight of a low viscosity saturated polyester resin containing 5 percent by weight of the nonionic surface active agent sorbitan monooleate, and the resulting mixture was stirred. Thereafter, liberated water was removed by decantation to obtain a paste containing 15 percent by weight of water. This paste was dried under reduced pressure at 55° C. for 5 hours to form a dehydrated paste, which was then dispersed in dioctyl phthalate to prepare a dispersion having strong pearl luster. Mixtures of the thus prepared dispersion with various organic vehicles could be used as pigments showing excellent pearl luster.

The above paste was homogeneously mixed with a methyl methacrylate prepolymer in an amount of 0.5 percent by weight based on the weight of the prepolymer. Subsequently, the resulting mixture was placed between 2 glass plates faced each other at an interval of 7 mm. The thus formed composite was immersed for 30 min. in boiling water to complete the polymerization of the prepolymer. After cooling the composite, the glass plates were removed to obtain a polymethyl methacrylate resin plate having a streamline pattern. FIG. 2 is a photograph of the thus obtained decorative plate.

EXAMPLE 4

3 parts by weight of the dehydrated paste of urazole formed in Example 3 was dispersed in 7 parts by weight of nitrobenzene. The resulting dispersion was thoroughly mixed with 1 part by weight of a 100 percent oil-soluble phenolic resin to prepare a pigment. The thus prepared pigment was applied onto a glass plate and then gradually dried, and the vaporization of the solvent was completed in a period of about 30 hours to obtain an excellent nacreous film.

EXAMPLE 5

100 l. of a 2 wt percent suspension of guanazine i.e., 3,4,5-triamino-1,2,4-triazole, was heated to form a solution, which was then cooled to 40° C. To this solution was added 50 g. of the cationic surface active agent "LEBON GM" (lauryl-dimethylammonium chloride; trade name of Sanyo Kasei Kogyo K.K.). Into the resulting mixture, ethanol was added dropwise with stirring at a rate of 1 liter per minute to precipitate flake-shaped fine crystals of about 1 micron in size. At this stage, the addition of ethanol was discontinued, and the liquid was maintained at 5° C. for 60 minutes to precipitate rhombic flake-shaped crystals having a maximum length of 15 microns, a width of 10 microns and a thickness of 700 A. When stirred, the liquid showed a strong streamline pattern. The precipitated crystals were recovered by filtration, washed with ethanol, airdried and then brought into the form of a paste by addition of a dispersing agent, a resin and the like. This paste was suitably diluted to obtain a nacreous pigment.

EXAMPLE 6

The air-dried guanazine crystals obtained in Example 5 were dispersed in dioctyl phthalate to form a dispersion having a crystal concentration of 40 percent. To 50 parts by weight of this dispersion were added 100 parts by weight of polyvinyl chloride resin, 0.7 part by weight of cadmium stearate and 0.5 part of barium stearate. The resulting composition was homogeneously mixed by means of a blender, and the thus formed mixture was kneaded on an oven roll at 170° C. and then sheeted by means of a calender roll to prepare a nacreous sheet.

When allowed to stand in a solution containing 0.1 mole/liter of hydrogen sulfide, a commercially available conventional nacreous sheet, which had been prepared by use of a nacreous basic lead carbonate was blackened, whereas the present nacreous sheet prepared in the above manner did not show any change and was excellent in quality.

EXAMPLE 7

1 kg. of colorless powder of 5-phenyl-3-hydroxy-1,2,4-triazole was dissolved at an elevated temperature in 100 l. of distilled water. This solution was thoroughly mixed with 100 g. of the amphoionic surface active agent "SARCOSYL -O" (oleyl sarcosine; trade name of Geigy Industrial Chemicals) and 100 g. of sodium alkylbenzenesulfonate. Subsequently, the resulting mixture was cooled with stirring to 60° C. to deposit a precipitate. This precipitate was removed by filtration, and the filtrate was cooled with stirring to 5° to 10° C. over a period of 6 hours and then allowed to stand at said temperature for 48 hours to deposit flake-shaped crystals having a maximum length of 10 to 20 microns, a width of 5 to 10 microns and a thickness of 700 to 1,000 A. The deposited crystals were centrifugally separated and then formed into a paste. This paste was washed with ethanol to prepare a nacreous pigment, which was then homogeneously mixed with a methyl methacrylate prepolymer in an amount of 0.5 percent by weight based on the weight of the prepolymer. Subsequently, the resulting mixture was placed between 2 glass plates faced each other at an interval of 7 mm. The thus formed composite was immersed for 30 minutes in boiling water to complete the polymerization of the prepolymer. After cooling the composite, the glass plates were removed to obtain a polymethyl methacrylate resin plate having a streamline pattern.

EXAMPLE 8

1 kg. of a colorless powder of 5-amino-3-carboxy-1,2,4-triazole was dissolved at an elevated temperature in 100 l. of distilled water. To this solution was added 200 g. of the cationic surface active agent "ACETAMINE" (alkylamino acetate; trade name of Kao Sekken K.K.), and the resulting mixture was cooled with stirring to 50° C. At this stage, there were added to the mixture about 10 g. of the guanazole crystals prepared in Example 1 (pentagonal crystals having a diameter of 15 to 20 microns and a thickness of 700 A), whereby the growth of flake-shaped crystals of 5-amino-3-carboxy-1,2,4-triazole was promoted, and flake-shaped crystals of said triazole began to deposit as the temperature of the liquid was lowered. After cooling to 5° to 10° C., the liquid was allowed to stand for 48 hours to deposit fan-shaped or rhombic fine crystals having a maximum length of 20 to 30 microns, a width of 10 to 20 microns and a thickness of 700 to 1,000 A. The thus deposited crystals were centrifugally separated, washed with ether and then dispersed in dioctyl phthalate to prepare a dispersion having strong pearl luster. Mixtures of this dispersion with various organic vehicles could be used as pigments showing excellent pearl luster.

EXAMPLE 9

| | |
|---|---|
| *Nitrocellulose incorporated with 3-mercapto-1,2,4-triazole | 20.0% by weight |
| Santolite | 7.5% by weight |
| Dibutyl phthalate | 3.8% by weight |
| Ethanol | 6.4% by weight |
| Butanol | 1.1% by weight |
| Toluene | 32.9% by weight |
| Coloring matter | 3.0% |

Note: * Nitrocellulose incorporated with 20 wt % of fine triazole crystals having a length of 15 microns, a width of 5 microns and a thickness of 700 A.

The above-mentioned ingredients were thoroughly mixed together to prepare a nail enamel having excellent pearl luster. Even when the nail enamel was allowed to stand for a long period of time, the main ingredient did not precipitate and thus was excellent in dispersibility, unlike in the case of a conventional product prepared by use of nacreous bismuth trichloride as a main ingredient.

EXAMPLE 10

1 kg. of a colorless powder of 1-phenyl-3-hydroxy-1,2,4-triazole was dissolved at an elevated temperature in 100 l. of distilled water. The resulting solution was throughly mixed with 25 g. of the amphoionic surface active agent "Sarcosil L" (laurylsarcosine; trade name of Geigy Industrial Chemicals) and 25 g. of sodium alkylbenzenesulfonate. Subsequently, the liquid was cooled with stirring to 5° to 10° C. over a period of 3 hours, and then allowed to stand at said temperature for 48 hours to deposit flake-shaped crystals having a maximum length of 10 to 15 microns, a width of 5 microns and a thickness of 700 to 1,000 A. The deposited crystals were centrifugally separated and then washed with ether to obtain crystals having pearl luster. The thus obtained crystals were formed into a paste of a suitable composition, mixed with plastics and then subjected to molding to obtain molded plastic articles having beautiful pearl luster.

What we claim is:

1. Nacreous flake-shaped crystals of at least one 1,2,4-triazole compound represented by the formula,

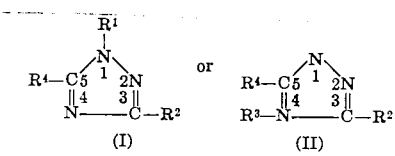

wherein $R^1$ is a —H, —CH$_3$, —C$_6$H$_5$ or —NH$_2$ group; $R^2$ is a —H, —CH$_3$, —C$_6$H$_5$, —NH$_2$, —SH, —COOH or —OH group; $R^3$ is a —H, —C$_6$H$_5$ or —NH$_2$ group; and $R^4$ is a —H, —CH$_3$, —C$_6$H$_5$, —NH$_2$, —SH, —COOH or —OH group, said crystals having a maximum length of 5 to 100 microns and a thickness of 500 to 1,200 Å.

2. Nacreous flake-shaped crystals according to claim 1, wherein the 1,2,4-triazole compound is guanazole, urazole, guanazine, 5-phenyl-3-hydroxy-1,2,4-triazole, 5-amino-3-carboxy-1,2,4-triazole or 3-mercapto-1,2,4-triazole.

3. A method for producing synthetic nacreous crystals which comprises cooling at a temperature not higher than 50° C. in the presence of a surface active agent a solution of at least one 1,2,4-triazole compound represented by the formula,

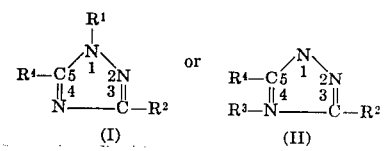

wherein $R^1$ is a —H, —CH$_3$, —C$_6$H$_5$ or —NH$_2$ group; $R^2$ is a —H, —CH$_3$, —C$_6$H$_5$, —NH$_2$, —SH, —COOH or —OH group; $R^3$ is a —H, —C$_6$H$_5$ or —NH$_2$ group; and $R^4$ is a —H, —CH$_3$, —C$_6$H$_5$, —NH$_2$, —SH, —COOH or —OH group, thereby precipitating flake-shaped crystals of the said compound.

4. A method according to claim 3, wherein the 1,2,4-triazole compound is guanazole, urazole, guanazine, 5-phenyl-3-hydroxy-1,2,4-triazole, 5-amino-3-carboxy-1,2,4-triazole or 3-mercapto-1,2,4-triazole.

5. A method according to claim 3, wherein the surface active agent is a cationic, anionic, amphoionic or nonionic surface active agent.

6. A method according to claim 5, wherein the cationic surface active agent is an amine, a salt thereof, a quaternary ammonium salt, a pyridinium salt, a picolinium salt, a zelanium salt, a belanium salt, an amine-formaldehyde condensation product or a stearon chromic chloride.

7. A method according to claim 5, wherein the anionic surface active agent is an alkyl sulfate, an alkylbenzene sulfonate, an alkylnaphthalene sulfonate, a naphthalene sulfonate-formaldehyde condensation product, an alkyl phosphate, an amidosulfonate or a sulfo-succinate dialkyl ester.

8. A method according to claim 5, wherein the amphoionic surface active agent is an alkylbetaine or a hydroxyethylimidazoline sulfonate.

9. A method according to claim 3, wherein the concentration of the surface active agent is 1 to 0.001 percent by weight based on the weight of the solution of triazole compounds.

10. A method according to claim 3, wherein the surface active agent is added from the beginning to the solution of triazole compound.

11. A method according to claim 3, wherein the surface active agent is added immediately before deposition of initial fine crystals of the triazole compound.

12. A method according to claim 3, wherein the surface active agent is added immediately after deposition of initial fine crystals of the triazole compound.

13. A method according to claim 3, wherein said solution of at least 1,2,4-triazole compound is cooled at a temperature between 5° to 50° C.

* * * * *

UNITED STATES PATENT OFFICE
CERTIFICATE OF CORRECTION

Patent No. 3,681,374　　　　　Dated August 1, 1972

Inventor(s) Nobumitsu Yano et al

It is certified that error appears in the above-identified patent and that said Letters Patent are hereby corrected as shown below:

Item 73, the first word in the name of the assignee should be changed from "Assahi" to --Asahi--.

Signed and sealed this 8th day of May 1973.

(SEAL)
Attest:

EDWARD M. FLETCHER, JR.　　　　ROBERT GOTTSCHALK
Attesting Officer　　　　　　　　Commissioner of Patents

UNITED STATES PATENT OFFICE
CERTIFICATE OF CORRECTION

Patent No. 3,681,374  Dated August 1, 1972

Inventor(s) NOBUMITSU YANO, ET. AL.

It is certified that error appears in the above-identified patent and that said Letters Patent are hereby corrected as shown below:

On the cover sheet insert -- [30] Foreign Priority Data   Japan   65312/69   Aug. 20, 1969 -- .

Signed and sealed this 20th day of November 1973.

(SEAL)
Attest:

EDWARD M. FLETCHER, JR.          RENE D. TEGTMEYER
Attesting Officer                Acting Commissioner of Patents

ORM PO-1050 (10-69)